UNITED STATES PATENT OFFICE.

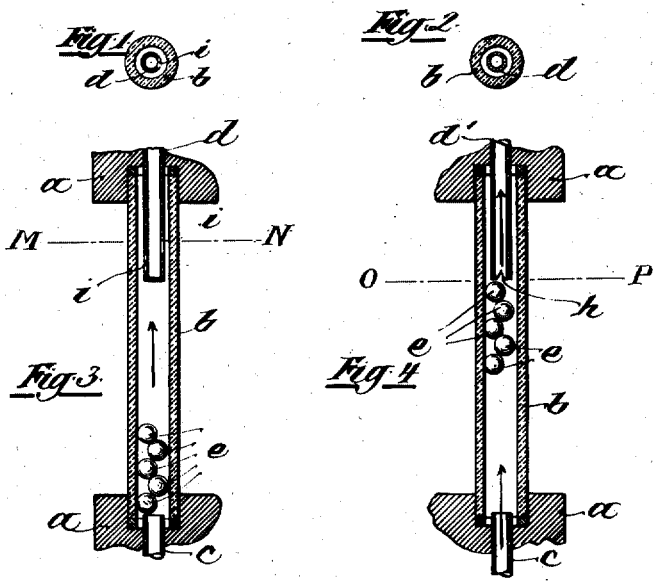

JULIUS SELLIN, OF STUTTGART, GERMANY.

FLOW-INDICATOR.

1,227,842.

Specification of Letters Patent.

Patented May 29, 1917.

Application filed September 9, 1913. Serial No. 788,830.

*To all whom it may concern:*

Be it known that I, JULIUS SELLIN, a citizen of the German Empire, residing at Stuttgart, in the Kingdom of Wurttemberg, Germany, have invented certain new and useful Improvements in Flow-Indicators, of which the following is a specification.

The present invention relates to a device designed for the indication of the flow of liquids in compression or suction conduits by simple auxiliary means in such a reliable manner that failure of these auxiliary means to operate is avoided. As shown, this insurance of safety is a requisite, particularly so with lubricating apparatuses in automobile and air-ship motors. This novel device is an improvement in devices in which gage-glasses are employed having arranged therein floating bodies. In the known devices of this kind these floating bodies consist of a plurality of members connected with each other and operating reciprocally, which however, under the influence of unfavorable conditions, are apt to fail in operation. Ordinary balls are employed in the novel device as floating bodies, which are not subject to any changes and which cannot cause any trouble.

Figures 1 and 2 of the drawing show horizontal cross-sections of the invention, taken on the lines M—N and O—P of Figs. 3 and 4, respectively, and Figs. 3 and 4 show vertical sections.

The disposition of gage-glasses in connection with lubricating apparatuses is well known. The individual gage-glasses $b$ are inserted, in a suitable manner, in the flanges $a$ of the lubricating apparatus in question and are tightly closed. An oil inlet pipe $c$ enters the gage-glass $b$ at the bottom while a discharge pipe $d$ projects into the gage-glass at the top. A few balls $e$ are contained within the gage-glass and are normally superposed upon the mouth of the inlet pipe $c$, as shown in Fig. 3. The balls $e$ are forced upward by the pressure exerted by the oil entering from the inlet pipe $c$ when the oil is forced into the gage-glass by the mechanism of the lubricating apparatus, so that the balls engage the discharge pipe as shown in Fig. 4. The balls sink to the bottom of the gage-glass when the pressure ceases and the same action takes place upon a subsequent period of compression. The discharge pipe $d$ is closed at the end in the modification shown in Fig. 3 and is provided with lateral apertures $i$ for the through passage of the oil. If it is desired to use a discharge pipe $d^1$ having an open end, notches $h$ are provided in the sides of the discharge pipe, through which notches the oil may pass even when the balls are in engagement with the discharge pipe $d^1$.

I claim:

A device for indicating the movement of fluids in pressure conduits comprising a gage glass, and balls movable in said gage glass and serving as floating bodies, said balls being specifically heavier than the fluid to be conveyed and having a diameter which is greater than the radius of the gage glass.

In testimony whereof I affix my signature in presence of two witnesses.

JULIUS SELLIN.

Witnesses:
 JEAN GULDEN,
 RUDOLF WALTERS.